United States Patent [19]

Lawall

[11] Patent Number: 4,715,811
[45] Date of Patent: Dec. 29, 1987

[54] PROCESS AND APPARATUS FOR MANUFACTURING LOW SULFUR CEMENT CLINKER

[75] Inventor: Thomas R. Lawall, Emmaus, Pa.

[73] Assignee: Fuller Company, Bethlehem, Pa.

[21] Appl. No.: 882,125

[22] Filed: Jul. 3, 1986

Related U.S. Application Data

[62] Division of Ser. No. 750,437, Jul. 1, 1985, Pat. No. 4,662,945.

[51] Int. Cl.$^4$ ............................................. F27B 15/00
[52] U.S. Cl. ...................................... 432/58; 432/106; 432/14
[58] Field of Search ..................... 432/105, 106, 14, 58

[56] References Cited

U.S. PATENT DOCUMENTS

| | | | |
|---|---|---|---|
| 3,869,248 | 3/1975 | Hirai et al. | 432/106 |
| 3,904,353 | 9/1975 | Bosshand et al. | 432/106 |
| 4,094,626 | 6/1978 | Boyhont et al. | 432/58 |
| 4,119,396 | 10/1978 | Abelitis et al. | 432/14 |
| 4,226,586 | 10/1980 | Brachthauser et al. | 432/58 |
| 4,372,784 | 2/1983 | Hess | 432/14 |
| 4,514,170 | 4/1985 | Kupper | 432/106 |

Primary Examiner—Henry C. Yuen
Attorney, Agent, or Firm—Frank H. Thomson

[57] ABSTRACT

A process and apparatus for manufacturing low sulfur cement clinker from cement raw meal containing sulfur or with fuel containing high levels of sulfur or a combination thereof. The process is carried out in an apparatus which includes a preheater, calcining furnace, clinkering furnace and clinker cooler. A separate source of fuel is added to the feed end of the kiln to maintain reducing conditions and temperatures for decomposing the sulfur compounds. Fresh air is added to the riser duct connecting the clinkering furnace with the calcining furnace and the preheater for converting sulfur dioxide to sulfur trioxide. Calcium oxide is added to the riser duct for absorbing the sulfur trioxide to form calcium sulfate. The calcium sulfate is then removed by a gas solid separator from the system. Excess fuel added to maintain reducing condition at the feed end is utilized in the calcining furnace.

4 Claims, 2 Drawing Figures

PROCESS AND APPARATUS FOR MANUFACTURING LOW SULFUR CEMENT CLINKER

This is a division of application Ser. No. 06/750,437 filed July 1, 1985, U.S. Pat. No. 4,662,945.

BACKGROUND OF THE INVENTION

This invention relates to a process and apparatus for manufacturing low sulfur cement clinker which utilizes a suspension preheater, suspension calcining furnace, rotary kiln as the clinkering furnace and a clinker cooler.

In the manufacture of cement, many raw components contain sufficient quantities of sodium, potassium, chlorine, and sulfur to generate problems in the quality of the final cement clinker. Consequently, specifications for cement are usually made which define the maximum concentrations of these compounds that are allowable in the final clinker. In order to manufacture clinker according to these specifications, it becomes necessary for the manufacturer to either find raw materials which are low in these elements or find some way to remove a portion of these elements from the raw material before the final clinkering stage.

A means currently being used to remove the undesirable elements has been the gas bypass in the riser duct from the kiln feed hood. Since the compounds of sodium, potassium, chlorine and sulfur tend to violatize in the kiln prior to reaching clinkering temperatures, the fumes are picked up by the kiln exhaust gases and then transported into the kiln feed hood and riser duct. As these fumes cool, they reach a point where they condense on the surface of the incoming cement raw feed and again travel back down the kiln to the hot zone where they will again be violatized. This cycling process will continue until the concentration of the undesirable compounds in the gas stream become so high that it exceeds the partial pressure of the compound and the violatization process is retarded. The compounds begin to stay in the material being processed and appear in the cement clinker.

When the partial pressures are reached, the exhaust gases in the kiln are at their highest level of concentration of compounds of sodium, potassium, chlorine and sulfur. To remove some of these compounds, a bypass duct is usually placed on the feed hood just above the kiln exhaust. A draft is induced in the bypass duct which is greater than the draft in the riser duct thus removing a fraction of the exhaust gases laden with the undesirable compounds. In conventional processes, these exhaust gases are then precipitated onto some dust and removed from the system. Unfortunately, the bypass removal system is effective only if the compounds can be violatized at the temperatures and atmospheres normally found in a cement kiln. There are instances where this is not the case.

U.S. Pat. No. 3,923,536 describes a cement manufacturing system with preheater and precalcining equipment wherein a mixing chamber is provided to mix hot kiln exhaust gases and cooler vent gases to aid in the removal of volatile matters such as alkali, chlorine and sulfur. This system is not believed to be adequate to remove all of the sulfur compounds.

The process of U.S. Pat. No. 3,923,536 assumes that the sulfur will leave the kiln in the form of volatilized calcium sulfate, sodium sulfate and potassium sulfate. These compounds do not decompose at high temperatures and oxidizing atmospheres, but instead, they remain intact and sublime (vaporize), all the time remaining as sulfates. The patentee reports that only 10-30% of these compounds that are introduced into the system are carried out of the back end of the kiln while the remaining 70-90% are discharged in the cement clinker.

According to the present invention, fuel is added to the feed end of the kiln to produce a reducing atmosphere. In this type of environment the sulfates decompose releasing the sulfur as $SO_2$ gas, leaving behind calcium oxide which is very stable as a solid up to termpratures of 4658 F.

According to the present invention, a means is described for gasifying practically all of the sulfur in the raw meal by operating the back end of the kiln under reducing atmosphere. At temperatures greater than approximately 1040° and under mildly reducing conditions, calcium sulfate which may be contained in the raw material reduces to calcium oxide and produces sulfur dioxide. The reactions can be summarized as follows:

$$CaSO_4 + CO \rightarrow CaO + CO_2 + SO_2$$

$$CaSO_4 + H_2 \rightarrow CaO + H_2O + SO_2$$

$$4\ CaSO_4 + CH_4 \rightarrow 4\ CaO + 2\ H_2O + CO_2 + 4\ SO_2$$

The technique of operating at reducing conditions has been tested in portland cement kilns and has been effective in separating sulfur from the sulfur compounds in the raw meal. The clinker from the reducing kiln has also been unusually low in sodium and potassium, indicating the possibility that a reducing atmosphere promotes greater volatilization of the alkali compounds.

It has been proposed in U.S. Pat. No. 4,173,487 to operate the rotary kiln at high back end temperatures and under reducing conditions. The technique of operating the kiln under reducing conditions is undesirable because it requires additional fuel input, most of which is wasted in the kiln exhaust gas in the form of CO and $H_2$. A second undesirable trend has been the heavy concentration of $SO_2$ and $SO_3$ in the kiln exhaust which would have to be removed before emitting the gas to atmosphere. According to the present invention, a method is provided which eliminates both of these undesirable conditions.

U.S. Pat. No. 4,421,563 discloses a process and apparatus for the production of cement clinker which uses solid fuel which is gasified and uses cement raw meal to desulfurize the gasified fuel. There is no removal of sulfur from the cement raw meal in this system. The process of the present invention will serve to remove sulfur from the system, whether it is part of the fuel or part of the raw meal.

SUMMARY

It is therefore the principal object of this invention to provide a method and apparatus for producing low sulfur cement clinker from raw materials and fuels containing compounds of sulfur which reduces the disadvantages of the prior methods and apparatus.

In general, the foregoing and other objects will be carried out by providing a process of manufacturing low sulfur cement clinker from cement raw mean in an apparatus including a clinkering furnace and a separate calcining furnace, said clinkering furnace having a feed end and a discharge end and means for supplying fuel to the discharge end to establish a burning zone in the clinkering furnace and a riser duct at the feed end for discharging combustion gas produced in the burning zone comprising the steps of producing and maintaining reducing conditions and temperatures near the feed end of the clinkering furnace for decomposing sulfur compounds contained in the cement raw meal and fuel and produce sulfur oxides, discharging combustion gases and sulfur oxides from the clinkering furnace through the riser duct at the feed end of the clinkering furnace, supplying fresh air to the riser duct to form sulfur trioxide; adding calcium oxide to the riser duct to absorb the sulfur trioxide and form calcium sulfate; separating the thus formed calcium sulfate from the combustion gases and fresh air: and supplying the separated combustion gases and fresh air to the calcining furnace.

The foregoing and other objects will also be carried out by providing an apparatus for producing low sulfur cement clinker comprising a rotary kiln having a feed end and a discharge end with an inlet for fuel at the discharge end for establishing a burning zone near the discharge end; a clinker cooler flow connected to the discharge end of the kiln; a stationary calcining furnace having an inlet for cement raw meal to be calcined, an inlet for fuel, an inlet for air for combustion and an outlet for spent combustion air and calcined cement raw meal; a first gas solids separator having an inlet for spent combustion air and calcined cement raw meal flow connected to the outlet of the calcining furnace and having an outlet for separated gas, and an outlet for separated calcined cement raw meal flow connected to the feed end of the kiln; a riser duct flow connecting the feed end of the kiln to the inlet for air for combustion of the calcining furnace for discharging combustion gas from the kiln; means for supplying fuel to the riser duct for producing in the riser duct reducing conditions and a temperature for decomposing sulfur compounds which may be contained in the cement raw meal and the fuel; means for supplying fresh air to the riser duct; means for diverting a portion of the calcined cement raw meal to the riser duct for absorbing volatilized sulfur compounds discharged from the feed end of the kiln with combustion gas; and means for separating the absorbed sulfur compounds from spent combustion gas and fresh air.

BRIEF DESCRIPTION OF THE DRAWING

The invention will be described in connection with the annexed drawing wherein.

DESCRIPTION OF THE PREFERRED EMBODIMENTS

Figure 1:
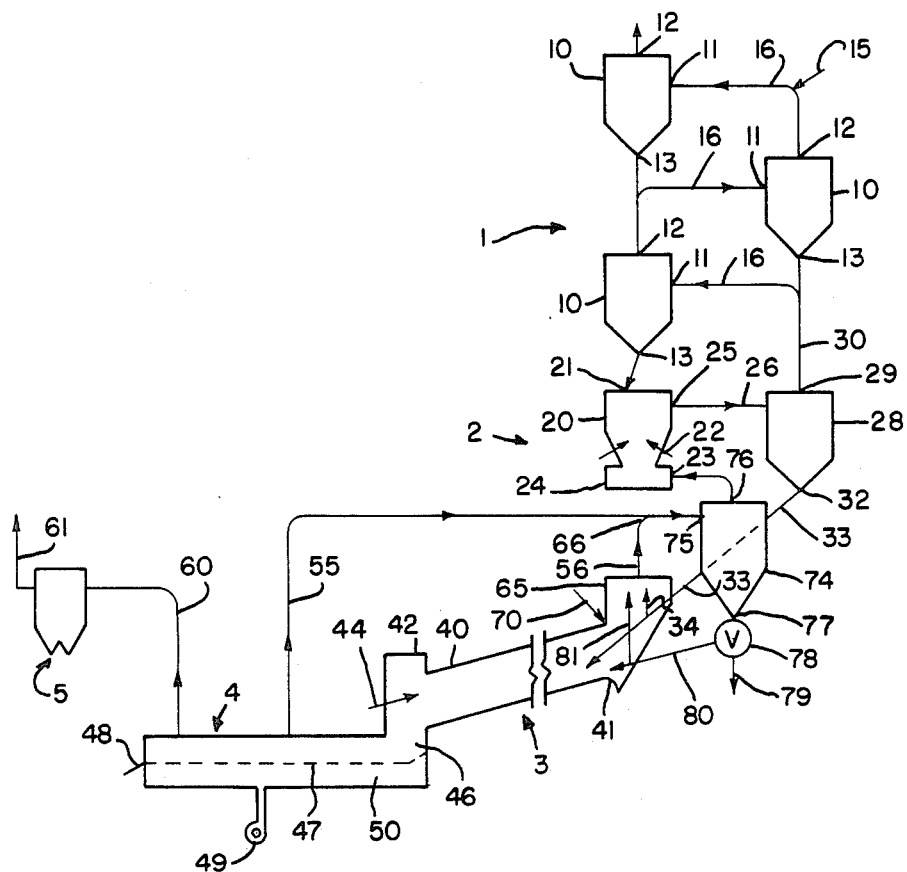
FIG. 1 is a diagramatic view of the apparatus according to the present invention.

Referring to the drawings and specifically to FIG. 1, the apparatus for carrying out the process of the present invention is illustrated. This apparatus includes a suspension type preheater generally indicated at 1, a stationary calcining furnace generally indicated at 2, a clinkering furnace or rotary kiln generally indicated at 3, a clinker cooler generally indicated at 4, and a high efficiency dust collection system generally indicated at 5. Each of these components of the apparatus is conventional and will not be described in detail.

The preheater 1 includes a plurality of serially connected cyclone type gas solid separators 10, each having an inlet 11 for gas and entrained cement raw meal, an outlet 12 for separated gas, and an outlet 13 for separated solids. The preheater includes an inlet 15 for cement raw meal. A conduit 16 flow connects the outlet 12 of one separator to the inlet 11 of the adjacent separator 10. In a conventional manner, as material is discharged from one separator through material outlet 13 it is supplied to a duct or conduit 16 where the material is entrained and conveyed to the adjacent cyclone 10 in the downstream direction. During the alternate entrainment/separation process, the raw mmeal is heated by the hot gases supplied to the preheater from the calcining furnace 2. Spent preheating gases discharged from the uppermost cyclone 10 are discharged from the system through a high efficiency dust collector in a known manner.

The stationary calcining furnace 2 may be conventional and well known in the art; one such furnace is shown in prior U.S. Pat. No. 3,891,382 issued June 24, 1975. The calciner includes a vessel 20 having an inlet 21 for preheated cement raw meal flow connected to the outlet 13 of the last in the series of cyclones 10 for receiving preheated cement raw meal. The calciner also includes burners generally indicated at 22 and an inlet 23 and scroll chamber 24 for receiving air for combustion. The calciner 2 also includes an outlet 25 for spent combustion gas and entrained at least partially calcined cement raw meal. The outlet 25 is connected by means of a duct 26 to a gas solids separator 28 of the cyclone type. The separator 28 includes an outlet 29 for hot spent combustion gas which is conveyed through a duct 30 for supplying hot gas to preheater 1 in a conventional manner. The cyclone 28 also includes an outlet 32 for supplying material through a duct 33 to the feed end of the kiln 3 through conduit 33.

The kiln system 3 includes a rotary kiln 40 having a feed end 41 and a discharge end 42 with a burning zone in the discharge end. Fuel is supplied to a burner 44 for generating a burning zone in the lower or discharge end of the kiln and maintaining temperatures sufficient to clinker the already calcined cement raw meal in a conventional manner. Oxidizing conditions are maintained in the burning zone for optimum clinker production and to control fuel usage.

The clinker cooler 4 has an inlet 46 flow connected to the discharge end 42 of the kiln 40. A gas permeable grate system 47, well known in the art, serves to convey material through the cooler to the outlet 48. Fan means 49 supplies cooling gas to a plenum chamber 50 below the grate system 47 for passage upwardly through the hot cement clinker for cooling the material. As the clinker is cooled, the cooling air is heated. A portion of the cooling air is returned to the kiln 40 as preheated secondary air for combustion. In a conventional system, additional heated cooling gas is supplied through a duct 55 to the calciner for acting as preheated combustion air for the calciner. With the present invention, this combustion air is supplied to riser duct 56 ahead of the calciner 2 which will be explained in detail hereinafter. Since the cooler requires more cooling air than can be used in the combustion process, a duct 60 is connected to a high efficiency dust collector system 5 such as a fabric filter or electrostatic precipitator for removing particulates. The exhaust from the collector 5 is supplied to a stack through duct 61 in a conventional manner.

According to the present invention, the feed hood 65 of the kiln 40 is connected to the riser duct 56 and then to a gas solid separator or cyclone 74. Fresh air from the cooler 4 is supplied through duct 55 to the riser duct 56 and then to the separator 74.

According to the present invention, reducing conditions are maintained at the feed end 41 of the kiln and in the feed hood 65 by the addition of fuel at 70. An alternate, not illustrated, would be to add shell burner near the feed end 41 of the kiln. It is intended that the temperature be maintained in excess of approximately 1040° C. The fuel supplied at 70 is preferably a low volatile fuel coal or coke. By maintaining reducing conditions at the feed end of the kiln, oxiding conditions may be maintained in the burning zone. It is not necessary to supply excess fuel through burner 44 and maintain the entire kiln at reducing condition. By maintaining the reducing conditions and the temperature near the feed end of the clinkering furnace, sulfur compounds in the cement raw meal and fuel are decomposed and sulfur dioxide is produced in the feed housing 65 and riser duct 56 according to the equations set forth above.

According to systems currently being used, the $CaSO_4$, $Na_2SO$ and $K_2SO_4$ are volatilized so that the entire compound is turned into a gas and this gas is removed through a by-pass system such as shown in U.S. Pat. No. 3,923,536 and others. According to the present invention, the $CaSO_4$ is decomposed into CaO ( which stays in the kiln and a gas $SO_2$ which leaves the kiln.

Fresh air is added from duct 55 to riser duct 56 at 66 to oxidize the sulfur dioxide to sulfur trioxide and to quench the gases from 1200° C. to 900° C. Some of the $SO_2$ may form into $SO_3$ before leaving the kiln so that both $SO_2$ and $SO_3$ are discharged from the kiln. Also according to the present invention a portion of the cement raw meal containing concentrated calcium oxide is diverted from conduit 33 at 34 to the feed hood 65. The calcium oxide supplied at diversion point 34 is injected into the $SO_3$ gases giving a maximum reaction time so that the CaO absorbs the sulfur trioxide to form calcium sulfate. The fresh air from cooler 4 is supplied to the riser duct in a quantity and at a temperature to cool combustion gases discharged from the kiln 3 to approximately 900° C. which is the temperature of maximum absorption for CaO and $SO_3$.

It should be noted that the feed hood 65 and the riser duct 56 are considered to be a duct at the feed end 41 of the clinkering furnace and the addition of fresh air and calcium oxide are essentially carried out simultaneously so that the reaction of sulfur dioxide to sulfur trioxide and absorption by the calcium oxide is essentially carried out substantially simultaneously.

With this invention, the reducing atmosphere at the feed end of the kiln releases the sulfur but the immediate injection of air creates an oxidizing atmosphere to transform the released $SO_2$ to $SO_3$ which is more easily absorbed by the CaO. Consequently, all particulate rejects in the process will be sulfates.

According to the process of the present invention, the spent combustion gas from the clinkering furnace 3 and the fresh air from the cooler 4 are supplied to the inlet 75 of the gas solids separator 74. The separator 74 also includes an outlet 76 for separated spent combustion gas and fresh air and an outlet 77 for separated solids. The separated fresh air and spent combustion gas containing unburned hydrocarbons left over from the addition of fuel at 70 or from the shell burner (not shown) are then supplied to the calcining furnace 2 where the residual fuel value is utilized in the calcining process.

The outlet 77 for solids may include a valve 78 which can be used for discharging from the system calcium sulfate separated by separator 74. In addition, a portion of the calcium sulfate may be diverted through conduit 80 to the feed end 41 of the kiln for controlling the sulfur level of the cement clinker at a predetermined desired value. If desired, a portion of the material discharged from cyclone 74 may be diverted from conduit 80 to the feed hood 65 so that a means is provided for recycling the absorbing particulates to produce a waste material which is higher in sulfur concentration. Conduit 81 may be used for this purpose.

Figure 2:
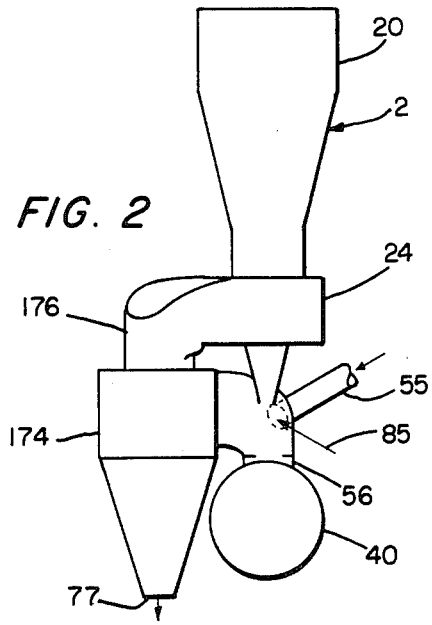
FIG. 2 is a view of a portion of the apparatus of the present invention as it may be applied to an existing cement manufacturing installation.

The present invention is illustrated in FIG. 1 as being a complete new system. The invention may also be utilized by modifying an existing suspension preheater, flash calciner system for manufacturing cement clinker. Such a system is illustrated in FIG. 2 where like numerals indicate similar parts as in FIG. 1. In this system, the riser duct from the kiln 40 is directly connected to a cyclone 174 which would be added to the existing system ahead of the calcining furnace 2. The cyclone 174 is close coupled by duct 176 to the inlet scroll 24 of calciner 2. A burner 85 is added to the riser duct 56. Instead of having the duct 55 connected directly to the scroll 24 of calciner 2 as with conventional systems, the duct 55 is moved to the riser duct 56 to achieve a system similar to that illustrated in FIG. 1.

It should be apparent that the objects of the present invention have been carried out. It is not necessary to supply total fuel to the burner 44 to maintain reducing conditions in the back end of the kiln. A system has been provided to remove substantially all of the sulfur in the cement raw meal and thereby produce a low sulfur cement while eliminating the disadvantage of discharging $SO_2$ and $SO_3$ to the atmosphere.

According to the present invention the process of manufacturing cement clinker from cement raw meal containing sulfur compounds is carried out in an apparatus including a fuel fired clinker furnace 3 and a calcining furnace 2. The clinker furnace has a feed end 41 and a discharge end 42. The process comprises the step of maintaining reducing conditions and temperature near the feed end 41 of the clinkering furnace 3 suitable for decomposing sulfur compounds which may be contained in the cement raw meal and fuel. This is done by the addition of fuel at 70 to the feed hood 65/riser duct 56 while maintaining oxidizing conditions in the burning zone of the clinkering furnace. Combustion gases produced in the burning zone and decomposed sulfur oxides ($SO_2$ and $SO_3$) are discharged from the clinkering furnace 3 through the riser duct 56. Hot fresh air is supplied from the cooler 4 to the riser duct 56. Calcium oxide is added to the riser duct 55/feed hood 65 to absorb the sulfur oxides. The absorbed sulfur oxides are then separated from the combustion gases in the cyclone 74. The separated fresh air and combustion gases are supplied from outlet 76 to inlet 23 of the calcining furnace 2.

It should be noted that the calcined cement raw meal diverted at 34 to the feed hood/riser duct will also contain magnesium oxide which will also absorb sulfur oxides to produce $MgSO_4$.

In addition to removing undesirable sulfur compounds, the present invention will be useful in removing undesirable alkali compounds. The addition of CaO and MgO to the riser duct/feed hood will absorb volatilized potassium and sodium compounds which will be removed from the system by cyclone 74 and outlet 79. The volatilized sodium and potassium compounds may leave the kiln as sulfates before coming into contact with the CaO.

It is intended that the foregoing be a description of preferred embodiments and that the invention be limited solely by that which is within the scope of the appended claims.

I claim:

1. Apparatus for producing low sulfur cement clinker comprising:

a rotary kiln having a feed end and a discharge end with an inlet for fuel at the discharge end for establishing a burning zone near the discharge end;

a clinker cooler flow connected to the discharge end of the kiln;

a stationary calcining furnace having an inlet for cement raw meal to be calcined, an inlet for fuel, an inlet for air for combustion and an outlet for spend combustion air and calcined cement raw meal;

a first gas solids separator having an inlet for spent combustion air and calcined cement raw meal, an outlet for separated gas, and an outlet for separated calcined cement raw meal;

a first duct flow connecting the outlet for spent combustion air and calcined cement raw meal of the calcining furnace to the inlet for spent combustion air and calcined cement raw meal of the first gas solids separator;

a second duct flow connecting the outlet for separated calcined cement raw meal of the first gas solids separator to the feed end of the rotary kiln;

a riser duct flow connecting the feed end of the kiln to the inlet for air for combustion of the calcining furnace for discharging combustion gas from the kiln;

means for supplying fuel to the riser duct for producing in the riser duct reducing conditions and a temperature for decomposing sulfur compounds which may be contained in the cement raw meal and the fuel;

means for supplying fresh air to the riser duct;

means for diverting a portion of the calcined cement raw meal from said second duct to the riser duct for absorbing decomposed sulfur oxides discharged from the feed end of the kiln with combustion gas; and separator means for separating the absorbed sulfur compounds from spent combustion gas and fresh air and having an inlet connected to the riser duct and an outlet for spent combustion gas and fresh air connected to the calcining furnace, and an outlet for absorbed sulfur compounds.

2. Apparatus for producing low sulfur cement clinker according to claim 1 wherein said clinker cooler includes means for passing cooling air through clinker discharged from the kiln whereby the clinker is cooled and the cooling air is heated; and further comprising conduit means for conducting a portion of the heated cooling air to the riser duct to define the means for supplying fresh air to the riser duct.

3. Apparatus for producing low sulfur cement clinker according to claim 2 further comprising means for supplying a portion of the separated absorbed sulfur compounds to the feed end of the kiln.

4. Apparatus for producing low sulfur cement clinker according to claim 3 further comprising means for preheating the cement raw meal to be supplied to the calcining furnace.

* * * * *